Patented Dec. 23, 1952

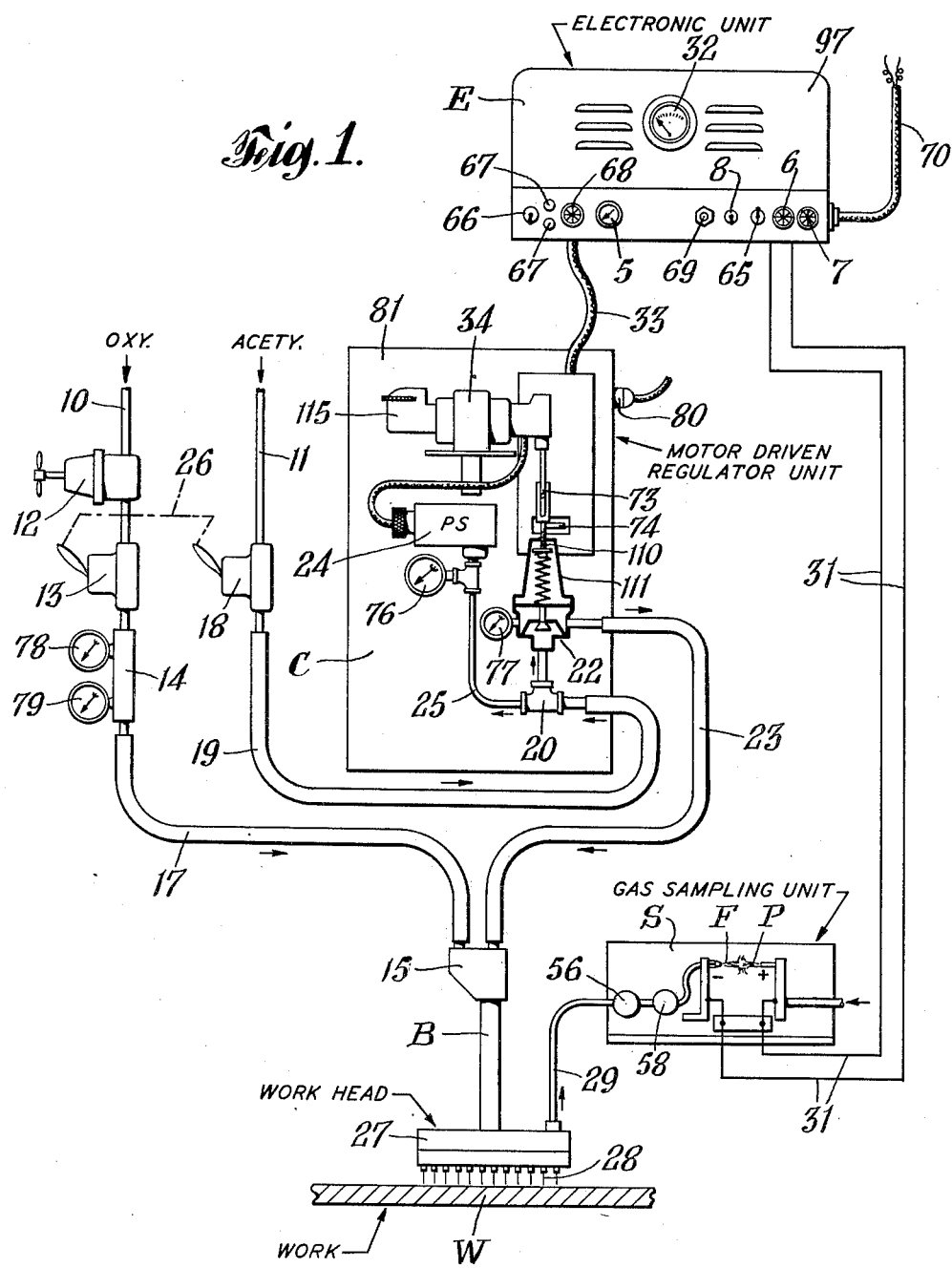

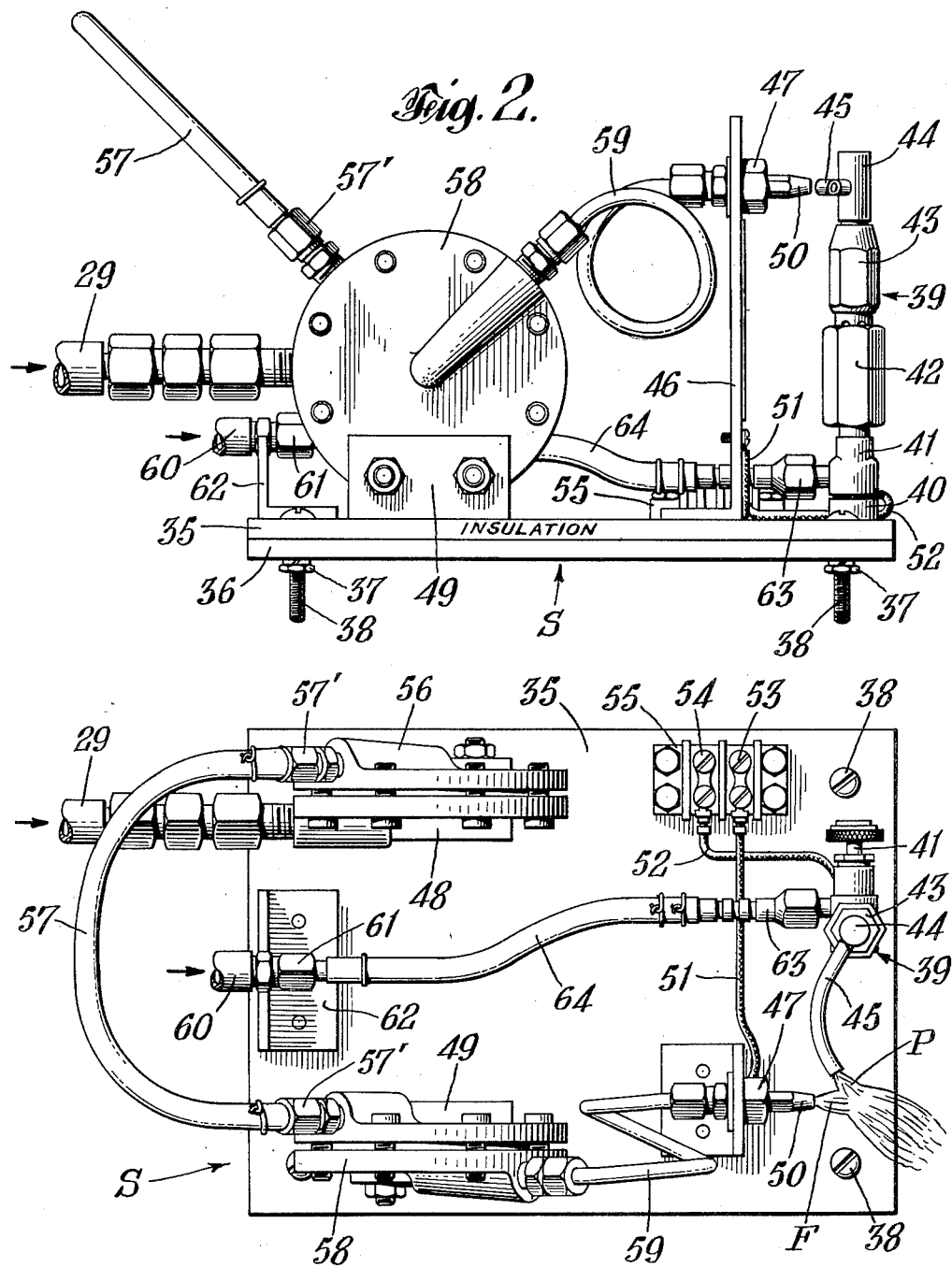

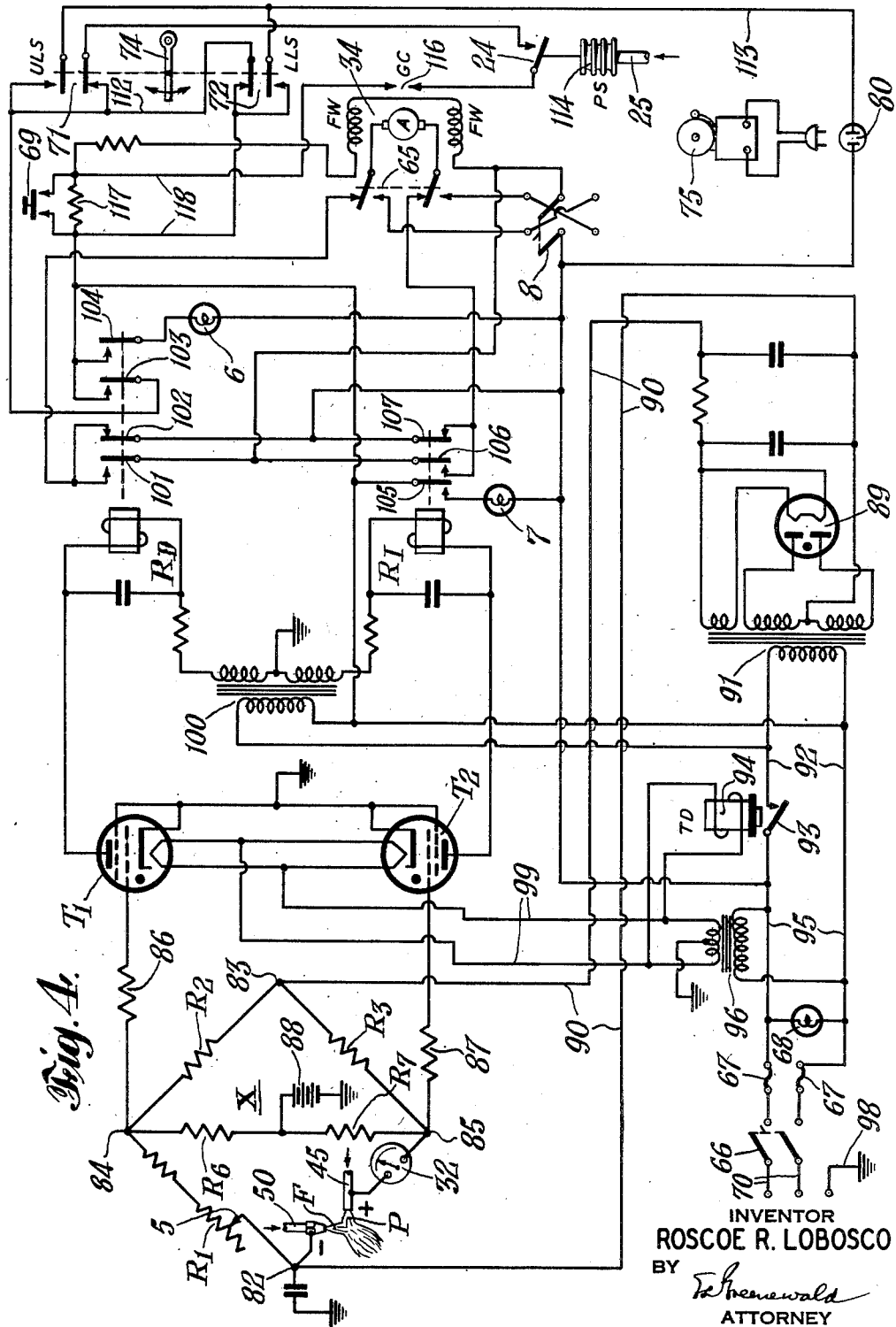

2,622,967

UNITED STATES PATENT OFFICE 2,622,967

AUTOMATIC GAS RATIO SAMPLING DEVICE

Roscoe R. Lobosco, Elizabeth, N. J., assignor, by mesne assignments, to Union Carbide and Carbon Corporation, a corporation of New York Application August 1, 1947, Serial No. 765,551
In Canada March 7, 1945

9 Claims. (Cl. 23—255)

This invention relates to automatic gas ratio control systems, and more particularly to such systems in which the operation for controlling the gas ratio depends on the electrical conductivity of a flame supplied by a sample stream of gas composed of a mixture of oxygen and fuel gas the ratio of which is to be controlled.

The present application is, in part, a continuation of application Serial No. 594,552, filed May 18, 1945, for "Flame Component Indicator and Control Means," now abandoned.

The main object of the invention is to provide an improved automatic gas ratio control system that is relatively simple and economical in its parts and one which also is safe, efficient, accurate and reliable in use. Other objects will appear in the following description.

In the drawings:

Fig. 1 is a view mainly in elevation of an automatic gas ratio control system illustrating the invention;

Fig. 2 is an enlarged view in elevation of the gas sampling unit or head;

Fig. 3 is a top plan view of such unit with the pilot flame and mixed gas flame burning; and Fig. 4 is a circuit diagram of the system.

The illustrated system comprises a commercially pure oxygen gas supply line 10 and an acetylene fuel gas supply line 11 which are connected, respectively, to suitable sources of supply of such gases under pressure. The oxygen gas supply line 10 contains an adjustable oxygen gas pressure regulator 12, a quick-acting shut-off valve 13, and a critical orifice meter 14; insuring a constant flow of oxygen at a desired pressure to an oxy-fuel gas mixer 15 of a blowpipe B to which mixer the outlet of the meter 14 is connected by a flexible hose 17. The critical flow meter operates not only to measure the flow of oxygen but also maintains that flow substantially constant regardless of changing pressure conditions at the mixer and blowpipe, so long as the input pressure of gas supplied to the critical orifice meter is maintained constant.

The acetylene fuel gas supply line 11 contains a quick-acting shut-off valve 18, the outlet of which is connected by a flexible hose 19 to a T-fitting 20 on a motor driven valve or regulator unit C. One outlet of the T-fitting conducts the fuel gas to a motor-driven fuel gas throttle valve such as a pressure regulator 22 which is connected to the mixer 15 by a flexible hose 23. The other outlet of the T-fitting is connected to a gas pressure responsive switch 24 by a pipe 25. The handles of the quick-acting shut-off valves 13 and 18 are connected to each other by a link 26 for mutual operation.

The oxy-fuel gas blowpipe B is provided with a work head or main burner 27 to the internal mixed gas chamber of which a combustible mixture of oxygen and acetylene are delivered for supplying oxy-acetylene flames 28 which impinge on work W. A conduit 29 is connected to the work head 27 for conducting a sample stream of the mixed gases to a gas sampling unit S. The conduit may consist of a length of copper tubing or a length of flexible hose or both.

The gas sampling unit S, which is described in detail below, is electrically connected by a circuit 31 to an electronic unit E, which is in turn electrically connected by an electric cord or cable 33 to the motor driven regulator unit C, so that any change in the gas ratio of the mixture supplied to the gas sampling unit S is indicated by a meter 32, and causes the electronic unit E automatically to operate a motor 34 to adjust the acetylene pressure regulator 22 and, thus, automatically restore the oxygen-acetylene gas ratio to the selected value.

From the foregoing it will be apparent that the system comprises three principal components, i. e., the gas sampling head or unit S, the electronic control unit E, and the motor driven valve or regulator unit C. The gas sampling unit S is shown more clearly in Figs. 2 and 3. Such unit comprises an electrically non-conductive panel 35 mounted on a base 36. These parts are held together by four bolts 37 located near the corners of the panel, providing dependent machine screws 38 for attachment to any suitable support. Mounted on the panel 35 is a pilot flame burner or tip 39 composed of metal and which includes a mounting block 40, a needle valve assembly 41, a valve adapter 42, an air gas mixer 43, and a pilot light connection 44 supporting a curved tip 45 composed of copper tubing which is disposed to direct its air-acetylene flame P horizontally.

Also mounted on the insulating panel 35 is a metal bracket 46 near the top of which is supported a mixed-gas flame tip fitting 47 also composed of metal. The bracket 46 and fitting 47 are positioned so that a mixed-gas flame burner or tip 50 directs a mixed gas sampling flame F in the same horizontal plane as that of the pilot flame P and in a direction forming an included angle of slightly less than 90° with the flame P.

The panel 35 serves to electrically insulate the tips 45 and 50, both of which are composed of metal, from each other; and a direct current electrical circuit to the flames F and P is established by insulated conductors 51 and 52, the ends of which are connected to the bracket 46 and mounting block 40, respectively, and to terminals 53 and 54 of an insulating strip 55 which is mounted on the panel 35. The terminals 53 and 54 are also connected to the input circuit 31 of the electronic unit E.

When the gas sampling tip 50 is the positive electrode of the gas sampling head, the flame resistance is fairly low, and the flame resistance is not an accurate measure of the gas ratio. However, when the gas sampling tip 50 is made the negative electrode of the gas sampling head, then the flame resistance is high, and such flame resistance is an accurate measure of the gas ratio. Therefore, in the gas sampling head S the gas sampling tip 50 is made the negative electrode with respect to the pilot flame tip 45 which is positive in the direct current circuit 31.

The combustible mixture of oxygen and acetylene which is delivered to the gas sampling unit S by the conduit 29 is conducted to the tip 50 through a filter type flash arrestor 56, a length of electrically insulating flexible transparent plastic tubing 57, a filter type flash arrestor 58, a length of copper tubing 59, and the fitting 47. The flash arrestors are mounted on the panel 35 by brackets 48 and 49. The tubing 57 serves to electrically insulate the flash arrestor 56 from the flash arrestor 58 and copper tubing 59 which leads to the burner fitting 47. In some cases the flash arrestor 58 can be omitted without departing from the invention.

Commercially pure fuel gas, in this case acetylene, is conducted to the gas sampling unit S by a hose 60 which is connected to a fitting 61 mounted on a bracket 62 which is connected to the base panel 35. The acetylene is conducted from the fitting 61 to an inlet fitting 63 of the gas burner 39 by a length 64 of flexible transparent plastic tubing. Such tubing 64 serves to electrically insulate the gas burner 39 from the gas supply hose 60.

As pointed out above, in the gas sampling head or unit S, a sample of the mixed gases is diverted from the blowpipe work head 27 and is burned upon discharge from the gas sampling tip 50. The constant ratio air-acetylene flame P intersects the mixed-gas sampling flame F at an included angle of slightly less than 90°, so as to keep ignited the mixed-gases discharged by the tip 50, and prevent the flame F from blowing out or off. Both the mixed-gas sampling tip 50 and pilot flame tip 45 are electrically insulated from each other and from ground. The terminal block or strip 55 provides means for electrically connecting such otherwise mutually electrically insulated tips 45 and 50 to the electronic unit E by way of the direct current circuit 31.

The electronic control unit E (Fig. 1) measures the conductivity of the flame F burning off the gas sampling head tip 50 and compares it with a desired conductivity. If the oxy-acetylene gas ratio of the flame F is higher or lower than the desired ratio, the electronic unit E automatically operates the motor driven acetylene regulator 22 in the proper direction to correct the error.

The electronic unit E is equipped with a gas ratio selecting knob 5, the ratio indicating meter 32, a pair of acetylene panel lights 6 and 7 to indicate when a correction is being made, a manual-automatic switch 8 so that the control can be obtained either automatically or manually, and an increase-decrease acetylene switch 65, a master switch 66 for turning the unit E on and off, a pair of protective fuses 67, and an on-off panel light 68 to indicate when the power is turned on, and a high speed push-button switch 69 for selectively operating the motor 34 at full speed without disturbing the normal governor setting of such motor.

The electronic unit E is protected by a suitable housing and is provided with an electrical power input cord or cable 70 and the power output cable 33, the latter being connected to the motor driven regulator unit C.

In the motor driven regulator unit C the reversible motor 34 is provided to adjust the acetylene valve or regulator 22 automatically in accordance with a signal from the electronic control unit E. The regulator unit C is equipped with two limit switches 71 and 72 (Fig. 4) to prevent overtravel of the regulator adjusting screw connection 73 when the electronic unit E is operating automatically, and with the pressure switch 24 which automatically starts the operation of the system each time the gases are supplied to the work head 27.

When either limit switch 71 or 72 is actuated through a hinged arm 74 by overtravel of the regulator-motor connection 73, an alarm signal 75 is energized, thus warning the operator that the regulator 22 is beyond its normal range of operation.

The regulator unit C also is equipped, as shown in Fig. 1, with a fuel-gas inlet pressure gauge 76 and a fuel gas outlet pressure gauge 77. If desired, where a large flow of fuel gas or acetylene is required, a pilot operated regulator may be substituted for the regulator 22, in which case the pilot unit is connected to the motor 34. Also a simple throttle valve may be used instead of a regulator or in combination therewith; in which case the throttle valve is operated by the motor 34.

The critical orifice flow meter 14 in the oxygen supply line is provided with oxygen inlet and outlet pressure gauges 78 and 79.

A receptacle 80 for the alarm signal 75 is provided on the motor driven regulator panel 81. The alarm signal 75 can be any suitable bell, horn, light, and can be located in any desired position.

A circuit diagram illustrating the entire system is shown in detail in Fig. 4. The electronic control unit E includes a Wheatstone bridge X, two arms of which consist of equal resistances $R_2$ and $R_3$, and the other two arms of which consist of an adjustable resistance $R_1$ and variable resistance, respectively, the variable resistance comprising the mixed gas flame F composed of the mixture of oxygen and fuel gas the ratio of which is to be controlled. The arm of the bridge containing such flame F constitutes the input circuit 31 of the control unit and contains, in series circuit relation, the ammeter 32, the pilot flame tip 45, the pilot flame P, the mixed gas flame F, and the mixed gas flame tip 50. The bridge circuit described has two pairs of substantially equal resistance arms. However, any modification of the bridge circuit is within the scope of the invention and the pairs of arms can bear any desired ratio to each other.

The electrical conductivity of the oxy-fuel gas flame F varies with the oxygen to fuel gas ratio when the potential of tip 50 is negative with respect to that of the tip 45. A highly carburizing flame has a relatively low conductivity, and the flame conductivity increases as the oxygen to acetylene ratio increases, until a maximum conductivity is reached beyond which the conductivity begins to decrease. The directional characteristic of the mixed gas flame is highly important, i. e., the potential of the pilot flame P must be positive and that of the mixed-gas flame must be negative for satisfactory operation of the system.

The conductivity versus oxy-acetylene ratio characteristic is consistent and accurate with the proper polarity selection. The electrical conductivity of the flame F is used in the system to indicate and control its ratio. In the present modification a small part of the mixed gases is diverted from the work head 27 and burned in the insulated tip 50 which is part of the gas sampling head S. If desired, the gases supplying the tip 50 can be diverted from the gas supply lines to the mixer 15, and mixed in the tip 50, without departing from the invention. The constant ratio air-acetylene pilot flame tip 45, which is also mounted on the gas sampling head S, directs its flame P so that the pilot flame P and mixed gas flame F mushroom on each other, as pointed out above. The pilot flame may be composed of oxygen and fuel gas, if desired, without departing from the invention; but an air-fuel gas flame is less expensive.

The measure of the conductivity of the flames P and F between such tips 45 and 50 indicates the ratio of the gases burning at the gas sampling tip 50 and the work head 27, since the same gas mixture is burned at both the work head and the gas sampling tip. The ammeter 32, which is connected in series with the flames, provides a direct indication of the gas flame conductivity. Such meter is calibrated in terms of gas ratio.

A constant voltage source is connected to opposite terminals 82 and 83 of the bridge X so that the same potential is applied to the adjustable and variable resistance arms thereof, and a pair of thyratrons $T_1$ and $T_2$ have their control grids, respectively, connected to the other terminals 84 and 85 of the bridge through current limiting resistors 86 and 87. A bias battery 88 is connected to the cathode-control grid circuit of the thyratrons by way of equal resistances $R_6$ and $R_7$ and the terminals 84 and 85 of the bridge X. Thus, one thyratron fires when the variable resistance of flame F rises above the adjustable resistance $R_1$, and the other thyratron fires when such variable resistance falls below the adjustable resistance $R_1$.

The constant voltage source connected to the terminals 82 and 83 of the bridge X consists of a full wave rectifier 89, the output circuit 90 of which is connected to such terminals 82 and 83; the input of the rectifier 89 being supplied by a transformer 91, the primary winding of which is connected to an alternating circuit 92 containing a normally open switch 93 of a time delay relay 94. The time delay relay 94 is energized from a circuit 95 through a transformer 96, the circuit 95 being provided with the fuses 67 and the signal light 68. The circuit 95 is connected to a suitable source of alternating current by the electrical cable 70 and the main power line or master switch 66. The metal casing or housing 97 of the electronic unit 32 is provided with a ground circuit 98.

When the switch 66 is closed, the signal lamp 68 lights and, after a suitable time delay, the relay 94 closes switch 93, resulting in the energization of rectifier 89 and the application of a constant source of direct current voltage to the terminals 82 and 83 of the bridge X. The time delay is provided to enable the filaments of the thyratrons $T_1$ and $T_2$ to be heated by electricity supplied through a circuit 99 connected to the secondary of the transformer 96 before applying grid and plate voltage to these tubes.

The output circuits of the thyratrons $T_1$ and $T_2$ include relays $R_D$ and $R_I$, power being supplied thereto from the AC circuit 92 through a transformer 100. The wiring arrangement is such that when thyratron $T_1$ fires, the relay $R_D$ is energized; and when the thyratron $T_2$ fires, the relay $R_I$ is energized. The relay $R_D$ is adapted to operate four switches 101, 102, 103 and 104, while the relay $R_I$ is adapted to operate three switches 105, 106, and 107. The arrangement is such that when the switches of the relay $R_D$ are moved from their normal position, the regulator driving motor 34, which includes an armature A and field windings FW, is driven in one direction; and when the switches of the relay $R_I$ are operated the motor is energized to operate in the reverse direction. It is believed that the circuit connections of Fig. 4 will be understood by those skilled in the art without any further detailed explanation thereof.

From the above it will be apparent that the gas sampling head S is connected to the electronic unit E which automatically compares the conductivity of the flame F of the gas sampling tip 50 with the conductivity of the standard resistor $R_1$ which is, in this case, the ratio selector rheostat comprising knob 5. The electronic unit E automatically acts to adjust and maintain the flame conductivity equal to that of the ratio selector rheostat. If the flame conductivity is higher than the desired value, the electronic unit causes one of the thyratron tubes to fire and energize its relay which, in turn, energizes the motor 34 of the motor driven regulator 22 in the direction which will correct the error.

If, on the other hand, the flame conductivity is lower than the desired value, the electronic unit E causes the other thyratron to fire and energize its relay which automatically makes the proper connections necessary to drive the motor driven regulator in the opposite direction to change the flow of fuel gas to correct this error. Thus, if the flame conductivity is higher or lower than the correct value, the electronic unit automatically acts to correct the error.

Since the conductivity of the standard resistor $R_1$ to which the flame conductivity is matched, is adjusted by means of gas-ratio selector knob 5, the flame conductivity can be adjusted to any desired value within the range of the rheostat $R_1$. Thus, any desired gas ratio can be selected and automatically maintained by properly setting the ratio selector.

The motor driven regulator panel 81 is usually located as closely as possible to the work head 27 in order to reduce the length of hose between the motor driven regulator 22 and the mixer 15. Gas stored in this hose 23 tends to lower the maximum speed of response, and, therefore, it is desirable to have such hose as short as possible.

The gas sampling head S also is mounted as closely as possible to the work head 27. However, this unit S is disposed away from the direct heat of the flames 28 and out of the direct path of the products of combustion—steam and smoke—resulting from the operation of the work head 27. The flash arrestors 56 and 58 are the type containing a filter disc. Thus the flash arrestor 56 acts to prevent "popping" of the mixed gases in the work head 27 from carbonizing the gas sampling tip insulating tube 57, while the flash arrestor 58 acts to prevent popping of the tip 50 from carbonizing such tube.

The pilot flame tip 45 on the gas sampling head S is connected to a suitable source of acetylene, and the needle valve 41 permits adjustment of the length of the pilot flame P. With a neutral flame F on the gas sampling tip 50, the pilot flame P should intersect the sampling flame F just beyond the inner cone of the sampling flame F.

If, during the operation of the unit, the oxygen supply fails, the motor-driven regulator will be driven in such a direction as to reduce the acetylene flow in an attempt to maintain the ratio. The upper limit switch 71 limits the upward travel of the regulator adjusting connection 73 so that the screw 110 will not be driven out of engagement with the thread in the regulator cap 111.

If, during the operation of the system, the acetylene supply fails, or the acetylene is diluted because of incomplete generator or line purging, or a glowing carbon particle forms on the end of the gas sampling tip 50, the motor-driven regulator 22 will be driven in such direction as to increase the acetylene flow in an attempt to maintain the ratio. The lower limit switch 72 limits the downward travel of the regulator adjusting screw 111 so that it will not be jammed down tight.

When either the upper or the lower limit switch is opened by overtravel of the regulator adjusting screw 111, the motor circuit 112 is opened, thus preventing further movement of the regulator adjusting screw 111, and the alarm circuit 113 is closed, thus warning the operator that an abnormal condition exists.

When the upper limit switch 71 is actuated, the unit C is rendered inoperative and will not return to automatic operation even though normal gas pressures are restored. In order to resume normal operation, the regulator adjusting screw must be returned to its normal operating range by throwing the manual-automatic switch 8 to the manual position, closing the high speed push-button switch 69, and then throwing the acetylene increase-decrease switch 65 to the increase position long enough to cause the motor 34 to drive the adjusting screw 110 back into its normal position. The unit C will then be ready to resume automatic operation. The circuit is purposely arranged so that it will be necessary to manually reset the unit C because it is believed that the operator should investigate any fluctuations or failure in the oxygen supply before resuming operations.

When the lower limit switch 72 is actuated because of failure or dilution of the acetylene supply, or because of a glowing carbon particle on the gas sampling tip 50, the unit E is rendered inoperative in the automatic position, but when normal conditions are restored, the unit E will return to automatic operation again. If necessary, the unit E can be operated manually without restoring normal conditions by depressing the high speed push-button switch 69 while making adjustments.

The pressure switch 24 on the motor-driven regulator panel 81 serves to render the automatic control operative each time the gases are turned on. It is operated by a bellows 114 in response to the pressure of the acetylene on the inlet side of the regulator 22. The pressure switch 24 can be adjusted to close at any desired inlet pressure. If it is adjusted close to the minimum usable gas inlet pressure, it will automatically stop the unit from operating whenever the pressure drops below the usable limit. However, if it is necessary to operate the unit while the pressure swtich 24 is open, this can be done by closing the high speed push-button switch 69.

The motor 34 used to drive the regulator 22 is equipped with an eddy-current governor 115 having contacts 116 and its speed can be varied over a wide range. The maximum speed is a function of the various time delays in the gas system. Since these time delays will vary with each installation, this speed adjustment usually will be made in the field.

When the high speed push-button closing the switch 69 is depressed, the governor speed control is removed, by shorting resistor 117 in the circuit 118 from the motor 34 which drives the regulator 22 and causes the motor to run at full speed. The use of this high speed control switch 69 permits rapid adjustment of the regulator 22 when putting the equipment into operation.

The system will not operate when either the upper or the lower limit switch is actuated or when the acetylene pressure switch 24 is open. Since the high speed push-button switch 69 shunts these switches, the unit E can be made to operate in either the manual or the automatic position by closing the high speed switch 69.

In many production setups it is sometimes necessary to make frequent changes in the apparatus and gas conditions to accommodate the various batches of work being processed by the machine. With the conventional method it is usually necessary to experiment with the gas flows each time the setup is changed in order to secure the desired performance. The invention provides a highly accurate means of repeating precisely, the flame conditions which were previously found to be satisfactory, without the necessity of experimenting each time a setup is made.

In order to successfully carry out some processes it is necessary to use and accurately maintain some certain gas ratio. A calibrated gas ratio control unit is provided so that an operator can secure any desired gas ratio by properly setting the ratio knob of the control unit. The efficiency of many processes can be increased by using an oxidizing flame instead of a neutral flame but in the past the use of an oxidizing ratio has been avoided because of the difficulty of accurately adjusting the gases to a specific oxidizing ratio. This invention provides reliable and accurate means for obtaining and maintaining any desired oxidizing ratio.

For many processes it is theoretically possible to secure greater efficiency of a better product either by suitably varying the heat input throughout the process cycle while maintaining the gas ratio constant, or by varying the gas ratio in a suitable manner throughout the process cycle. In practice, program heating of this nature has seldom been attempted because of the difficulty of following and repeating any given heat program. The gas ratio control system of the present invention provides ready and accurate means for setting up and repeating any such program. Furthermore, the system can be arranged to follow any desired program automatically without any attention on the part of the operator.

There are situations where neither an accurate setting of the gas ratio nor accurate control of the heat input is required. In such cases the gas ratio system of the present invention permits the use of the minimum volume of gases and it avoids drifting, thus making possible an appreciable saving in gases.

From the above it is evident that the invention provides closer control of flame conditions than has been possible in the past and that the maintenance of the proper conditions will no longer be dependent on the operator's judgment and skill. Furthermore, it should enable an operator to turn out more uniform work with less spoilage since flame conditions can be maintained constant at all times.

The present modification of the invention contains many circuit and apparatus improvements which are not disclosed in the original patent application. The following lists and briefly describes some of such improvements and novel features.

The electrical circuit of the present invention includes the basic Wheatstone bridge X described in application Serial No. 594,552, with the addition of a number of important improvements and critical refinements. For example: The meter 32 is connected in series with the flame detector FP to measure the flame current so that the electronic unit E will not only control the oxy-fuel gas ratio but also indicate such ratio.

The "manual-automatic" switch 8 is provided so that the electronic unit E can function as an automatic gas ratio control or the gas ratio can be controlled manually by means of an "acetylene-increase-decrease" switch 65.

Acetylene "increase" and "decrease" panel lights 6 and 7 are provided to indicate when an automatic ratio correction is being made; and, if so, in what direction the correction is being made. Such panel lights 6 and 7 also assist in making the proper bias adjustment of the battery 88.

The gas pressure switch 24 is responsive to the acetylene line pressure and prevents the electronic unit E from operating in the "automatic" position when the acetylene is turned off. If such pressure switch 24 is not in the circuit, the electronic unit will try to cut down the acetylene flow setting by screwing out the acetylene regulator 22 when the gases are turned off.

The motor 34 which drives the acetylene regulator 22 is equipped with the adjustable governor 115, so that the speed of correction can be set to suit the conditions of any particular setup.

The motor-driven acetylene regulator 22 is equipped with the arm 74 controlling the "upper limit switch" 71 to prevent the adjustment connection 73 from being driven out of engagement, and the "lower limit switch" 72 to prevent the adjustment connection 73 from being jammed down tight. When either one of such limit switches is actuated, the automatic control circuit is rendered inoperative and thus prevents overtravel of the adjustment connection. When either limit switch is actuated an alarm device such as the bell 75 or light is energized, thus warning the operator of an abnormal condition.

The lower limit switch 72 is automatically actuated if: The acetylene pressure drops below the minimum pressure required to obtain the desired gas flow. The acetylene is diluted with air. A glowing particle of carbon forms on the gas sampling tip. In any case the unit will resume automatic operation as soon as normal conditions are restored.

The upper limit switch 71 is automatically actuated in the event of failure of the oxygen supply. The circuit is arranged so that regulator 22 must be restored to the normal operating range by the manual switch 8 before the system will resume automatic operation. However, if desired, the circuit can be arranged so that it resumes automatic operation as soon as the oxygen pressure is restored.

The "high speed" push-button switch 69 which shorts out the governor contacts 116, is provided so that manual or automatic adjustments can be made at full motor speed, if desired. Since such switch 69 also shorts out the upper and lower limit switches 71 and 72 and the pressure switch 24, as well as the governor contacts 116, the system will operate regardless of whether or not the limit switches or the pressure switches are actuated when such switch 69 is closed.

Application Serial No. 594,554 disclosed that either the oxygen or the fuel gas could be automatically controlled when the other gas is maintained constant. In actual practice it has been found that the most satisfactory arrangement is to automatically control the flow of the acetylene while the oxygen flow remains constant. This is done for the following reason:

With the apparatus available and the usual field conditions, it is easier to maintain a constant oxygen flow than it is to maintain a constant acetylene flow. Oxygen flow can be measured quite accurately and the flow maintained within close limits by means of the calibrated critical flow orifice meter 14. There is no simple means for accurately maintaining or measuring the flow of acetylene and its flow can and does vary. Therefore, it is best to apply the automatic control to the gas which is most likely to vary since this method will introduce the least variation in the process conditions.

When means is thus provided for maintaining a constant oxygen flow, the system provides highly accurate means for obtaining heat control since the heat delivered to the work is a function of the two gas flows. Experience indicates that use of the gas ratio control system as a heat control device is industrially important.

In application Serial No. 594,552 several modifications of gas component detectors are described and shown. It has been found that the most suitable form of detector is that in which a sample of the mixed gases is diverted from the main work head 27 and burned in a separate gas sampling tip 50, as is shown in Fig. 1 of the present application.

Fig. 1 of application Serial No. 594,552 shows two insulated tips T burning the mixed gas sample which is diverted from the work head H. A separate pilot flame is required to ignite the gases issuing from such tips. Since it is only the conductivity in one direction through the flame that varies with the gas ratio (i. e., with the gas sampling tip electrically negative and the electrode positive) the second flame acts only as the positive electrode to make contact with the first flame. The present modification takes advantage of this fact by using a single gas sampling flame F and using a pilot flame P as the positive electrode flame as well as the means for igniting the gas sampling flame.

It was found that where the mixed gas pressures were high and the gas velocities were high, there was some difficulty in getting the flame to burn on the gas sampling tip. It was found that by mounting a burner 39 so that the pilot flame P was at substantially right angles to the gas sampling flame F, and so that the pilot flame intersected the gas sampling flame just at the end of the inner cone of the sampling flame, the sampling flame would always burn back at the tip 50.

One of the most difficult problems in connection with this invention was to find suitable means for electrically insulating the gas sampling tip 50. The resistance of a gas sampling flame of neutral ratio is of the order of several million ohms and, therefore, to avoid errors, the electrical insulation between the gas tips must be very good. Furthermore, it is necessary to avoid leakage from either flame to ground since this would upset the operation of the electronic circuit. The problem is further complicated by the fact that "pops" will usually cause a flame to pass through the entire mixed gas system releasing carbon and depositing it on the insulation and thus result in enough current leakage to cause serious errors in the operation of the unit after a few pops. Various designs incorporating means for cleaning these deposits or for quickly replacing the leaking insulation were tried but field tests showed that none of these methods was entirely satisfactory.

The final gas sampling unit S which gave satisfactory performance is the one shown in Figs. 2 and 3. The tips 45 and 50 are insulated from the remainder of the equipment by means of short lengths of insulating tubing 57 and 64 which serve to conduct the gases to the insulated tips. This tubing provides a long leakage path and therefore it can withstand a greater deposit of carbon without developing enough leakage to cause trouble as would be the case if a short leakage path were used. The insulating tubing 64 supplying gas to the pilot flame carries pure acetlylene which will not burn within the tubing and will, therefore, seldom have to be replaced.

The insulating tubing 57 connected to the gas sampling flame carries a combustible mixture of oxygen and acetlylene gases and, therefore, may carbonize after a large number of pops, and will then have to be replaced. This tubing is supplied with standard hose fittings 57' 57' for quick replacement. Tests indicates that, when used with a filter as described below, tubing with soft, flexible walls develops less carbon deposits, due to popping, than a hard walled tubing. Flexible plastic tubing is used because it has a high insulation resistance, it is soft and flexible, and it is semi-transparent so that any carbon deposits within the tubing can be seen and replacement made when necessary.

There is one possible explanation of the fact that there is less tendency for carbon to deposit on a soft walled tube than on a hard walled tube. When a flame is burning normally on a tip it receives part of the oxygen required to burn the acetylene from the mixed gas and partly from the surrounding atmosphere. When the combustible mixture pops, the flame burns inside the mixed gas system, where there is not sufficient oxygen to completely burn all of the acetylene. The flame sets up a high pressure at the point of burning as it traverses rapidly through the mixed gas system. The combination of the high temperature and the high pressure causes the acetylene to break down and release free carbon which then settles out in the mixed gas system or blows out of the flame tip. This is a common occurrence in oxy-acetylene equipment and the carbon deposited in the work frequently causes trouble by obstructing the tip where a very small gas tip is used. However, when the flame traverses through a section of soft walled tubing the walls "give" and as a result the maximum pressure reached is not as high as when hard walled tubing is used. The lower pressure in this case is not high enough to cause the acetylene to break down and release carbon and, therefore, very little carbon is released.

It was found also that, if a flash arrester 56 containing a suitable filter was placed ahead of the insulating tubing in the mixed-gas sampling tip line, the trouble caused by leakage due to carbonizing of the tubing caused by pops in the work head was eliminated. The filter is a disc having a fine porous structure. A filter disc which is satisfactory was produced by pressing and sintering finely powdered bronze. Glass wool was satisfactory but the wool had a tendency to fuse and as a result had to be replaced frequently. It is likely that any form of filter having a fine enough structure and thick enough to arrest a flame will be satisfactory. It is believed that this disc does more than filter the carbon out of the mixed gases going to the gas sampling tip. If this filter disc were acting to filter out suspended carbon it should gradually plug up with the accumulated carbon removed from the gases. However, it was found that, even after thousands of pops it showed no signs of plugging up, therefore, it is not likely that it is acting as a simple filter. It is believed that the filter permits the normal flow of gas to the gas sampling tip without too great a pressure drop, but that it acts as a barrier to pressure waves caused by pops and reflects these pressure waves back into the work blowpipe, and thus prevents the carbon freed by the pop from being carried into the filter and clogging it.

The gas sampling tip 50 pops each time the work head gases are turned off and the flame can be observed passing back through the insulating tube 57. When the filter is used upstream of the insulating tubing, very little if any carbon is deposited when the gas sampling tip is popped for ratios ranging from a highly oxidizing flame to approximately an IX feather flame. For flames more carburizing than an IX feather, the tubing will gradually carbonize. It was found that if two filters were used, one before and the other after the insulating tubing, the tubing would not carbonize even with a highly carburizing flame since no flame passes through the tube. The structure of both of these filters should be dense enough to prevent a flame from passing through.

The fine porous structure of the filters disc is easily clogged by dirt, carbide residue, carbon particles carried by the gases. To prevent this trouble, a filter having a coarser structure, is placed in the line ahead of the main filter. This inexpensive filter element can be quickly replaced when it clogs up.

In some cases where the heating head consists of one or more tips which are individually mixed as in the case of tip-mixed or post-mixed tips, it is not always possible to obtain directly a sample of the mixed gases for the gas sampling tip. In such a case, a sample of the pure acetylene and pure oxygen are diverted from the header which feeds the work head tips and these gases are fed into a self-mixed gas sampling tip (or into a mixer and tip). Since changes in ratio in a self-mixed tip type head are obtained by changing the header pressures, any change in gas ratio in the work head flames will also produce a change in the gas ratio of the gas sampling tip flame. Therefore, when the ratio control unit automatically keeps the gas sampling tip gas ratio constant, it also keeps the work head gas ratio constant.

The two gas lines feeding the gas sampling tip must be insulated from the tip. This insulation can be provided by means of short lengths of insulating tubing. There is no carburization of the insulation with this method of gas sampling since only pure gases pass through the insulating tube. An insulated pilot flame (as previously described) can be used to ignite the gases issuing from the gas sampling tip and it can also be used as the positive electrode contacting the flame.

Matter disclosed herein is claimed in my divisional application, Serial No. 275,291, filed March 7, 1952, for Automatic Gas Ratio Control System.

I claim:

1. In a gas sampling unit for a work head having a mixer for combustion supporting gas and fuel gas, a mixture conduit connected to said mixer and extending therefrom and connected to said work head for supplying mixed gases thereto, the combination with a mixed-gas sampling flame tip composed of electrically conductive material, means including a sampling conduit in communication with said work head, supplying said sampling flame tip with a sample of the combustion-supporting gas and fuel gas in the same ratio at which such gases are supplied to said work head; of a pilot flame burner composed of electrically conductive material, means including a mixer and valve assembly in communication with said pilot flame burner, supplying such pilot flame burner with combustion supporting gas and fuel gas in a constant ratio, a frame supporting said tip and burner in position whereby the streams of gases therefrom intersect so that the pilot flame lights the sampling flame, means including an electrical circuit comprising a direct current source of power, said sampling flame tip and said pilot flame burner, conducting direct current through the sampling flame tip as a positive electrode and the pilot flame burner as a negative electrode, said frame comprising electrical insulating material interposed between said tip and burner, electrically insulating said tip and burner from each other.

2. In a gas sampling unit for a main burner having a mixer for combustion supporting gas and fuel gas, a mixture conduit connected to said mixer and extending therefrom and connected to said burner for supplying mixed gases thereto, the combination with a mixed-gas sampling flame tip composed of electrically conductive material and forming part of an electrical circuit for conducting current through the sampling flame, of a mixed-gas supply line connected to conduct a sample of mixed combustion supporting gas and fuel gas to said tip from said main burner, said line including a length of electrically insulating tubing, and a filter type flash arrester disposed in the supply line at the inlet end of said tubing and between said burner and said sampling flame tip, which filter type flash arrester acts as a protective barrier for said sampling flame tip in the event of a backfire in the main burner.

3. In a gas sampling unit as defined by claim 2, said tubing having a wall which is soft and flexible.

4. In a gas sampling unit for a work head having a mixer for combustion supporting gas and fuel gas, a mixture conduit connected to said mixer and extending therefrom and connected to said work head for supplying mixed gases thereto, the combination with a mixed-gas sampling flame tip composed of electrically conductive material and forming part of an electrical circuit for conducting current through the sampling flame, of a mixed-gas supply line connected for conducting a sample of mixed oxygen and fuel gas to said tip from said work head consisting of a main burner, said line including a length of electrically insulating tubing, a filter type flash arrester disposed in the supply line at the inlet end of said tubing and between said work head and said tubing which filter acts as a protective barrier for said sampling flame tip in the event of a backfire in the main burner, and a filter type flash arrester disposed in the supply line at the outlet end of said tubing and between said tubing and said sampling flame tip which acts to prevent flame and carbon from entering the tubing and forming an electrically conductive leakage path in the event of a backfire in the sampling flame tip.

5. In a gas sampling unit for a work head having a mixer for combustion supporting gas and fuel gas, a mixture conduit connected to said mixer and extending therefrom and connected to said work head for supplying mixed gases thereto, said unit comprising a gas sampling flame tip, a mixed-gas sampling conduit connected to said work head for supplying said tip, a frame on which said tip is mounted, a fixed gas ratio air-acetylene pilot flame burner positioned on said frame so that the pilot flame intersects the gas sampling flame, means including a mixer and valve assembly connected to said pilot flame burner, supplying the latter with combustion supporting gas and fuel gas in a constant ratio, and electrically insulating material interposed between said frame and the gas sampling tip and pilot flame burner to insulate the same from each other and from the ground, electrically insulated conductors connected to a source of power and to said tip and burner to provide an electrical circuit including said tip and burner and the flames, and a current responsive device in said circuit, the current in which circuit is a measure of the ratio of the gases forming the sampling flame.

6. A gas sampling unit for a work head having a mixer for oxygen and acetylene, a mixture conduit connected to said mixer and extending therefrom and connected to said work head for supplying mixed gases thereto, comprising the combination of an air-gas pilot flame burner composed of electrically conductive material, an electrically non-conductive tube connecting said burner to a source of acetylene, means including a mixer and valve assembly connected to said tube and pilot burner, supplying said pilot burner with air and acetylene in a constant ratio, a mixed-gas flame tip composed of electrically conductive material, an electrically non-conductive hose connecting said tip to said work head as a source of mixed oxygen and acetylene, an electrically non-conductive member supporting said burner and tip so that they are electrically insulated from each other and positioned so that the pilot flame and mixed-gas flame intersect and impinge on each other, and electrically insulated conductors connected to a source of power and to said tip and burner to form an electrical circuit including said burner and tip.

7. A gas sampling unit for a work head having a mixer for oxygen and fuel gas, a mixture conduit connected to said mixer and extending therefrom and connected to said work head for supplying mixed gases thereto, said unit comprising an air-gas pilot flame burner composed of electrically conductive material, means supplying gas to said burner including an electrically non-conductive fuel-gas delivery tube, a separate mixer and valve assembly interposed between said tube and burner supplying the burner with combustible gas composed of air and fuel gas at a fixed ratio, a mixed-gas flame tip composed of electrically conductive material, a sampling conduit connected to said work head for supplying mixed gas to said mixed gas flame tip, an electrically insulated frame supporting said burner and tip in mutually insulated relation and in position with the streams of gas therefrom intersecting and so that their flames merge with each other, insulated electrical conductors connected to a source of power and respectively connected to said burner and tip, said sampling conduit comprising a flash arrester having a mixed oxygen and fuel gas inlet communicating with said work head, and a tube composed of flexible plastic connected to the outlet of said flash arrester and to the inlet of said tip.

8. A gas sampling unit for a work head having a mixer for oxygen and fuel gas, a mixture conduit connected to said mixer and extending therefrom and connected to said work head for supplying mixed gases thereto, said unit comprising in combination, an electrically non-conductive panel, an air-fuel gas mixture pilot flame burner composed of metal mounted on said panel, means supplying gas to said burner including an electrically non-conductive fuel gas delivery tube, a separate mixer and valve assembly interposed between said tube and burner supplying to the burner combustible gas in a fixed air-gas ratio, a mixed-gas flame tip composed of metal mounted on said panel, means comprising a sampling conduit connected to said work head and leading to said mixed gas flame tip for supplying oxygen and fuel gas thereto in the same ratio at which said gases are supplied to said work head, said mixed gas flame tip being mounted on said panel in position to discharge a gas stream composed of a combustible mixture of oxygen and fuel gas toward the air-fuel pilot flame of said burner and intersect the same, a flash arrester mounted on said panel and interposed between said sampling conduit and said mixed gas flame tip and having a mixed oxygen-fuel gas supply inlet connected to said sampling conduit, and an electrically non-conductive hose leading from the gas outlet of said flash arrester to the gas inlet of said tip.

9. In an automatic gas ratio sampling device, the combination of a work head having a mixer for combustion supporting gas and fuel gas, a mixture conduit connected to said mixer and extending therefrom and connected to said work head for supplying mixed gas thereto, a gas sampling unit having a gas sampling flame tip, and a tubular connection from said work head containing a gas filter type flash arrester and an insulating tube leading to said gas sampling flame tip for conducting mixed-gas from the gas supply of such head to said tip, the gas filter type flash arrester acting to prevent "popping" of the work head gas from carbonizing the gas sampling flame tip insulating tube.

ROSCOE R. LOBOSCO.

REFERENCES CITED

The following references are of record in the file of this patent:

UNITED STATES PATENTS

| Number | Name | Date |
|---|---|---|
| 824,638 | Deforest | June 26, 1906 |
| 1,719,898 | McNeil | July 9, 1929 |
| 1,809,280 | Knowles | June 9, 1931 |
| 1,839,515 | Wetherbee | Jan. 5, 1932 |
| 1,960,350 | Shackleton | May 29, 1934 |
| 2,072,384 | Schmidt | Mar. 2, 1937 |
| 2,073,249 | Morgan | Mar. 9, 1937 |
| 2,127,977 | Lamb | Aug. 23, 1938 |
| 2,149,441 | Jacobson | Mar. 7, 1939 |
| 2,174,923 | Labino | Oct. 3, 1939 |
| 2,285,866 | Markle | June 9, 1942 |
| 2,324,821 | Campbell | July 20, 1943 |
| 2,352,143 | Willis | June 20, 1944 |
| 2,366,170 | Bates | Jan. 2, 1945 |
| 2,386,648 | Aubert | Oct. 9, 1945 |
| 2,437,720 | Ackler | Mar. 16, 1948 |